United States Patent Office 3,056,777
Patented Oct. 2, 1962

3,056,777
NEW BENZIMIDAZOLES
Paul E. Wittreich, Colonia, and Karl A. Folkers, Plainfield, N.J., and Franklin M. Robinson, Ambler, Pa., assignors to Merck & Co., Inc., Rahway, N.J., a corporation of New Jersey
No Drawing. Filed Dec. 19, 1960, Ser. No. 76,485
8 Claims. (Cl. 260—239.9)

This invention relates to new benzimidazoles. More specifically, this invention relates to 1-(nitrophenacyl)- and 1-(nitrophenylsulfonyl)-benzimidazoles of the structure—

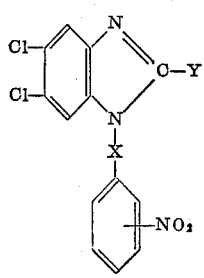

in which X may be $SO_2$ or $CO$ and Y may be a hydrogen or hydroxyl substituent.

The compounds of this invention are prepared in one of two ways, depending on whether the 2-position is to have a hydrogen or a hydroxyl substituent. In those cases where the 2-position is to have a hydrogen substituent, 5,6-dichlorobenzimidazole is heated in an inert solvent (e.g., benzene, toluene, and the like) with a small amount of an organic base (e.g. pyridine, the picolines, dimethylamine and the like) and a nitrobenzenesulfonyl chloride or a nitrobenzoyl chloride. The product separates from the reaction mixture upon cooling.

In those cases where a 2-hydroxyl substituent is desired, the same reactants are used, but the reaction medium is an alcoholic solution of a strong inorganic base. An example of such a reaction medium is an ethanolic sodium hydroxide solution. The 5,6-dichlorobenzimidazole is again reacted with the nitrobenzenesulfonyl chloride or nitrobenzoyl chloride.

The compounds of this invention are useful in their own right as fungicides or fungistats. They are also useful as intermediates for dyestuffs, diuretics, antibacterials or hypoglycemic agents. As an example of such utility as an intermediate, the compounds of this invention can be heated with aqueous sodium sulfide to effect the reduction of the nitro group. The resulting amino compounds can then, by well-known procedures, be diazotized and coupled with components such as β-naphthol, 3-hydroxy-2-naphthoic acid, or the anilide or toluide of the latter acid. The azo compounds thus formed are dyestuffs. The diazotization and coupling can be carried out on the cloth, in the well-known manner of an azoic dyestuff, either by padding or printing the amine upon the cloth already padded with the coupling component. As another example of utility as an intermediate, the reduction of the nitro group forms a sulfanilamide which is of interest as an intermediate for diuretics, and per se, as a diuretic and also as an antibacterial compound.

This invention can be illustrated by the following examples:

Example 1

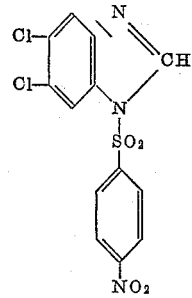

One gram (.0054 mole) of 5,6-dichlorobenzimidazole and 1.19 g. (.0054 mole) of p-nitrobenzenesulfonyl chloride are dissolved in a mixture of benzene (50 ml.) and pyridine (5 ml.) The resultant clear solution is heated on a steam bath for thirty minutes. A semi-crystalline mass comes out upon cooling the solution to room temperature. This solid is collected and triturated with methylene chloride (12 ml.). The methylene chloride solution is concentrated to dryness under reduced pressure. The residue is recrystallized from dioxane, yielding .37 g. of 1-(p-nitrobenzene sulfonyl)-5,6,-dichlorobenzimidazole, M.P. 217–219°.

*Analysis.*—Calcd. for $C_{13}H_7N_3C_2SO_4$: C, 41.95; H, 1.90. Found: C, 42.23; H, 2.20.

Example 2

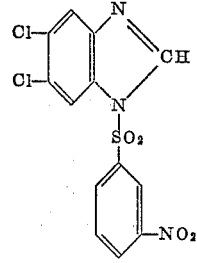

One gram (.0054 mole) of 5,6-dichlorobenzimidazole and 1.19 g. (.0054 mole) of m-nitrobenzenesulfonyl chloride are dissolved in a mixture of benzene (50 ml.) and pyridine (5 ml.). The resultant clear solution is heated on a steam bath for thirty minutes. A semi-crystalline mass comes out upon cooling the solution to room temperature. This solid is collected and triturated with methylene chloride (12 ml.). The methylene chloride solution is concentrated to dryness under reduced pressure. The residue is recrystallized from dioxane yielding .78 g. of 1-(m-nitrobenzenesulfonyl-5,6-dichlorobenzimidazole, M.P. 209–211°.

*Analysis.*—Calcd. for $C_{13}H_7N_3Cl_2SO_4$: C, 41.96; H, 1.90. Found: C, 41.91; H, 1.74.

Example 3

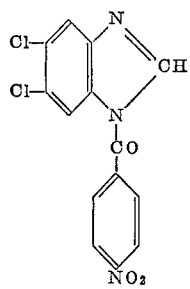

One gram (.0054 mole) of 5,6-dichlorobenzimidazole and .993 g. (.0054 mole) of p-nitrobenzoyl chloride are dissolved in a mixture of benzene (50 ml.) and pyridine (5 ml.). The reaction mixture is refluxed for thirty minutes and a crystalline mass comes out upon cooling the mixture to room temperature. This solid is collected and triturated with hot benzene (100 ml.). Upon cooling the benzene solution, .48 g. of solid, M.P. 208–210°, precipitates. The product is dissolved in methylene chloride (20 ml.) and a small amount of insoluble material is removed by filtration. Sufficient petroleum ether is added to bring the solution to turbidity, and the product crystallizes. The yield of 1-(p-nitrobenzoyl)-5,6,dichlorobenzimidazole, M.P. 211–213°, is .25 g.

Analysis.—Calcd. for $C_{13}H_7N_3Cl_2O_3$: C, 50.14; H, 2.10; N, 12.44. Found: C, 50.02; H, 2.10; N, 12.50.

Example 4

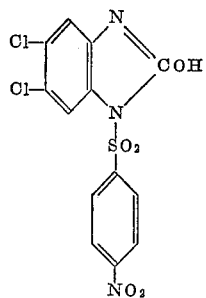

Five grams (.027 mole) of 5,6-dichlorobenzimidazole and 5.9 g. (.027 mole) of p-nitrobenzenesulfonyl chloride are dissolved in a mixture of 2.5 N sodium hydroxide (150 ml.), and 50% ethanol (150 ml.). The solution is heated on a steam bath for one hour, then cooled and acidified with concentrated hydrochloric acid. The product which forms is allowed to crystallize overnight. The solid is collected, washed with water, and after two recrystallizations from methanol 2.7 g. of 1-(p-nitrobenzenesulfonyl) - 2-hydroxy - 5,6 - dichlorobenzimidazole, M.P. 246–248° was obtained;

$\lambda_{max.}^{Nujol\ mull}$ 2.95, 3.22, 6.19, 6.52, 7.38, 8.78μ

Analysis. — Calcd. for $C_{13}H_9N_3SCl_2O_5$: C, 40.01; H, 2.33; N, 10.76; C, 18.18. Found: C, 39.77; H, 1.82; N, 10.82; Cl, 17.75.

Example 5

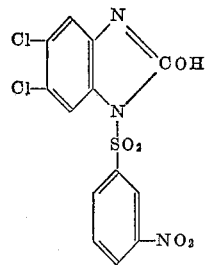

The procedure of Example 4 is followed using m-nitrobenzenesulfonyl chloride in place of the p-compound.

There is obtained 2.9 g. of 1-(m-nitrobenzenesulfonyl)-2-hydroxy-5,6-dichlorobenzimidazole, M.P. 194–195°;

$\lambda_{max.}^{Nujol\ mull}$ 2.95, 3.22, 6.21, 6.3, 7.35, 8.67μ

Analysis. — Calcd. for $C_{13}H_9N_3SCl_2O_5$: C, 40.01; H, 2.33; N, 10.76. Found: C, 40.00; H, 1.94; N, 10.38.

We claim:
1. A compound of the formula—

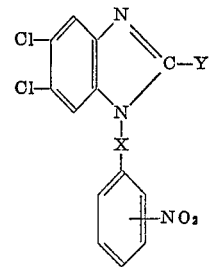

in which X is selected from the group consisting of $SO_2$ and CO and Y is selected from the group consisting of hydrogen and hydroxyl.

2. The compound—

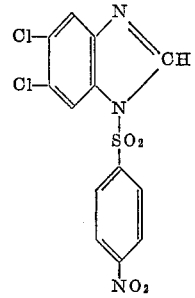

3. The compound—

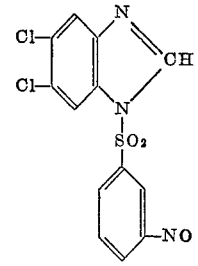

4. The compound—

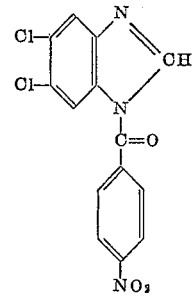

5. The compound—

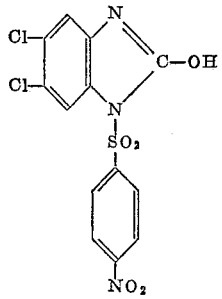

6. The compound—

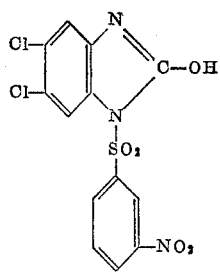

7. A process of preparing compounds of the formula—

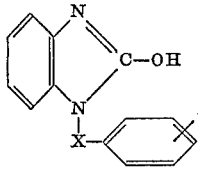

in which X is selected from the group consisting of $SO_2$ and CO, which comprises heating a solution of 5,6-dichlorobenzimidazole in an inert solvent in the presence of an organic base and a compound of the formula—

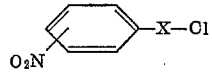

8. A process of preparing compounds of the formula—

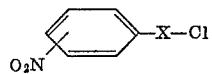

in which X is selected from the group consisting of $SO_2$ and CO which comprises heating a solution of 5,6-dichlorobenzimidazole in an alcoholic solution of a strong inorganic base and a compound of the formula—

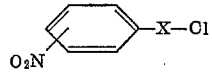

No references cited.